United States Patent
Okada et al.

(10) Patent No.: US 6,501,876 B1
(45) Date of Patent: Dec. 31, 2002

(54) BIDIRECTIONAL OPTICAL COMMUNICATION DEVICE AND BIDIRECTIONAL OPTICAL COMMUNICATION APPARATUS

(75) Inventors: Kuniaki Okada, Tenri (JP); Yorishige Ishii, Yamatotakada (JP); Toshiyuki Matsushima, Nara (JP); Hideaki Fujita, Shiki-gun (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/295,060

(22) Filed: Apr. 20, 1999

(30) Foreign Application Priority Data

Apr. 20, 1998 (JP) .......................................... 10-109711

(51) Int. Cl.$^7$ ............................................... C02B 6/26
(52) U.S. Cl. .............................. 385/31; 385/50; 385/88; 359/152
(58) Field of Search ................................ 359/113, 152; 385/33, 50, 52, 88, 90, 31, 89, 91, 92

(56) References Cited

U.S. PATENT DOCUMENTS

| | | | | |
|---|---|---|---|---|
| 4,611,884 A | * | 9/1986 | Roberts | 385/44 |
| 5,526,452 A | * | 6/1996 | Dannoux et al. | 385/39 |
| 5,787,215 A | * | 7/1998 | Kuhara et al. | 385/88 |
| 5,796,899 A | * | 8/1998 | Butrie et al. | 385/92 |
| 5,883,748 A | * | 3/1999 | Shum | 359/819 |
| 5,963,349 A | * | 10/1999 | Norte | 359/113 |
| 6,027,255 A | * | 2/2000 | Joo et al. | 385/88 |
| 6,157,760 A | * | 12/2000 | Fuijta et al. | 385/49 |

FOREIGN PATENT DOCUMENTS

| JP | 61-086713 | 5/1986 |
|---|---|---|
| JP | 62-25907 | 2/1987 |
| JP | 63-279627 | 11/1988 |
| JP | 03-39706 | 4/1991 |
| JP | 03-69107 | 7/1991 |
| JP | 04-31843 | 3/1992 |
| JP | 07-113924 | 5/1995 |
| JP | 07-174925 | 7/1995 |
| JP | 8-262276 | 10/1996 |
| JP | 08-313766 | 11/1996 |
| JP | 09-251119 | 9/1997 |
| JP | 10-2279283 | 8/1998 |
| JP | 11-101926 | 4/1999 |

OTHER PUBLICATIONS

J. Cross et al., "A Single–Fiber Bidirectional Optical Link Using Colocated Emitters and Detectors," IEEE Photonics Technology Letters, vol. 8, No. 10 (Oct. 1996).

* cited by examiner

Primary Examiner—Hemang Sanghavi
Assistant Examiner—Omar Rojas
(74) Attorney, Agent, or Firm—David G. Conlin; Steven M. Jensen; Edwards & Angell, LLP

(57) ABSTRACT

Bidirectional optical communication devices are attached to both ends of an optical fiber, and each of them has a transmitting light wave guide coupled to a semiconductor laser and a received light wave guide which is coupled to a photodiode, and optically separated from the transmitting light wave guide. On the end face of the light-incident area of the optical fiber on which transmitting light coupled to the optical fiber from the transmitting light wave guide is directed, the light axis of the transmitting light is set so as to tilt with respect to the normal to the end face of the light-incident area so as to prevent reflected light on the end face of the light-incident area caused by the transmitting light from entering the photodiode installed on the same side as the semiconductor laser. Consequently, light communication is simultaneously carried out bidirectionally in a stable manner by using a single optical fiber; thus, it is possible to provide a bidirectional optical communication device and a bidirectional optical communication apparatus using this device at low costs.

18 Claims, 11 Drawing Sheets ns and the wave
guide polarizing beam splitters 33 and 37, are required,
resulting in high costs, and since the polarization-
maintaining optical fiber 31 is a single-mode optical fiber
with a small core diameter of several μm, with the result that
time-consuming tasks are required in positioning the respective
optical communication modules 32 and 36 and the
polarization-maintaining optical fiber 31 to each other.

In the second prior art, the light-emitting elements 41 such
as semiconductors, etc., having mutually different generating
waveforms and the bidirectional optical communication
devices provided with the wavelength filters 43 having
mutually different transmitting wavelengths have to be
installed at both of the ends of the optical fiber 44, and the
characteristics of the respective bidirectional optical communication
devices have to be changed. This makes the
construction of bidirectional optical communication links
complex, and results in difficulty in reducing the costs of the
bidirectional optical communication device and the bidirectional
optical communication link using those parts.

SUMMARY OF THE INVENTION

In order to address the above-mentioned problems, the
objective of the present invention is to provide a bidirectional
optical communication device and a bidirectional
optical communication link using the device in which the
bidirectional optical communication device and an optical
fiber are easily positioned at low costs.

In order to solve the above-mentioned problems, a bidirectional
optical communication device in accordance with
the present invention is provided with: a light-emitting
element for generating signal light in accordance with a data
signal, a light-receiving element for receiving the signal
light and for generating a data signal in accordance with the
signal light, a transmitting light wave guide for projecting
transmission light that is the signal light from the light-
emitting element to an optical fiber outside, a received light
wave guide for guiding received light that is signal light
BIDIRECTIONAL OPTICAL COMMUNICATION DEVICE AND BIDIRECTIONAL OPTICAL COMMUNICATION APPARATUS

FIELD OF THE INVENTION

The present invention relates to a bidirectional (two-way)
optical communication device and a bidirectional optical
communication apparatus which can carry out bidirectional
optical communication simultaneously by using a single
optical fiber.

BACKGROUND OF THE INVENTION

With respect to conventional bidirectional optical communication
devices used for bidirectional optical communication
links (bidirectional optical communication
apparatuses), Japanese Laid-Open Patent Application No.
279627/1988 (Tokukaishou 63-279627) discloses such a
device (first prior art). As illustrated in FIG. 9, this bidirectional
optical communication device is provided with a first
optical communication module 32 and a second optical
communication module 36. The first optical communication
module 32 and the second optical communication module 36
are respectively connected to one end and the other end of
a single polarization-maintaining optical fiber 31.

Moreover, the first optical communication module 32 is
provided with a first wave guide polarizing beam splitter 33,
a first semiconductor laser 34 and a first photo-detector 35.
The second optical communication module 36 is provided
with a second wave guide polarizing beam splitter 37, a
second semiconductor laser 38 and a second photo-detector
39. Here, the wave guide polarizing beam splitters 33 and
37, which are made from a birefringence substance such as
LiNbO$_3$, function to transmit TE (Transverse Electric) mode
light projected from the semiconductor lasers 34 and 38 so
as to project TM (Transverse Magnetic) mode light on the
lower faces of substrates 40 and 40'.

The TE mode light, projected from the first semiconductor
laser 34 of the first optical communication module 32, is
transmitted through the first wave guide polarizing beam
splitter 33, coupled to the polarization-maintaining optical
fiber 31, transferred through the polarization-maintaining
optical fiber 31 while maintaining its plane of polarization,
emitted from the other end of the polarization-maintaining
optical fiber 31 and guided to the second optical communication
module 36.

As illustrated in FIG. 10, the first optical communication
module 32 and the second optical communication module
36, connected to the polarization-maintaining optical fiber
31, are installed so that planes of polarization of the respective
output lights are aligned orthogonal to each other. For
this reason, the output light of the first optical communication
module 32 forms TM mode light in the second optical
communication module 36, with the result that it is not
transmitted through the second wave guide polarizing beam
splitter 37, and detected by the second photo-detector 39
installed on the lower surface of the substrate 40'. In the
same manner, the output light from the second optical
communication module 36 is also detected by the first
photo-detector 35 in the first optical communication module
32.

Moreover, with respect to another conventional bidirectional
optical communication link, Japanese Laid-Open
Patent Application No. 262276/1996 (Tokukaihei 8-262276)
discloses such a link (second prior art). As illustrated in FIG.
11, this bidirectional optical communication link is constituted
by a light-emitting element 41 and a light-receiving
element 42, two lenses 45 and 46, a wavelength filter 43 that
transmits light having the first wavelength λ1 and reflects
light having the second wavelength λ2, and an optical fiber
44 whose light inputting and outputting end face 44a is
diagonally polished. Here, the light-emitting element 41, the
light-receiving element 42, two lenses 45 and 46 and the
waveform filter 43 constitute a bidirectional optical communication
device.

Light having the first wavelength λ1 released from the
light emitting element 41 is converged by the first lens 45,
and coupled to the optical fiber 44 through the wavelength
filter 43. Light having the second wavelength λ2, which is
an inputted light from the optical fiber 44, is reflected by the
wavelength filter 43, converged by the second lens 46 and
coupled to the light-receiving element 42.

In the case when the end face 44a is placed so as to be
orthogonal to the inputted light, a portion of the light having
the first wavelength λ1 is reflected by the end face 44a, and
the reflected light is again reflected by the wavelength filter
43 and directed to the light-receiving element 42, with the
result that cross talk tends to occur. However, in this second
prior art, since the end face 44a is tilted, the reflected light
from the end face 44a of the optical fiber 44 is not allowed
to enter the second lens 46, thereby reducing cross talk.

Here, the first and second prior arts have the following
problems: In the first prior art, expensive members, such as
the polarization-maintaining optical fiber 31 and the wave
guide polarizing beam splitters 33 and 37, are required,
resulting in high costs, and since the polarization-
maintaining optical fiber 31 is a single-mode optical fiber
with a small core diameter of several μm, with the result that
time-consuming tasks are required in positioning the respective
optical communication modules 32 and 36 and the
polarization-maintaining optical fiber 31 to each other.

In the second prior art, the light-emitting elements 41 such
as semiconductors, etc., having mutually different generating
waveforms and the bidirectional optical communication
devices provided with the wavelength filters 43 having
mutually different transmitting wavelengths have to be
installed at both of the ends of the optical fiber 44, and the
characteristics of the respective bidirectional optical communication
devices have to be changed. This makes the
construction of bidirectional optical communication links
complex, and results in difficulty in reducing the costs of the
bidirectional optical communication device and the bidirectional
optical communication link using those parts.

SUMMARY OF THE INVENTION

In order to address the above-mentioned problems, the
objective of the present invention is to provide a bidirectional
optical communication device and a bidirectional
optical communication link using the device in which the
bidirectional optical communication device and an optical
fiber are easily positioned at low costs.

In order to solve the above-mentioned problems, a bidirectional
optical communication device in accordance with
the present invention is provided with: a light-emitting
element for generating signal light in accordance with a data
signal, a light-receiving element for receiving the signal
light and for generating a data signal in accordance with the
signal light, a transmitting light wave guide for projecting
transmission light that is the signal light from the light-
emitting element to an optical fiber outside, a received light
wave guide for guiding received light that is signal light from the optical fiber outside, and a positioning means for positioning the transmitting light wave guide, the received light wave guide and the optical fiber so as to optically connect with one another, wherein: the transmitting light wave guide and the received light wave guide are mutually optically separated from each other, and the light axis of the transmission light is set so as to tilt with respect to the normal to the end face of the optical fiber.

With the above-mentioned arrangement, in the case when the above-mentioned arrangements are connected to both of the ends of an optical fiber so as to form a bidirectional optical communication apparatus, signal light from the light-emitting element is coupled to the optical fiber through the transmitting light wave guide, and transferred to one end to the other end of the optical fiber, while signal light from the optical fiber is sent through the received light wave guide, and received by the light-receiving element at which the corresponding data is generated.

Thus, the above-mentioned arrangement makes it possible to transfer transmitting light and received light bidirectionally using a single optical fiber for transmitting signal light, thereby allowing bidirectional communication.

Moreover, in the above-mentioned arrangement, the transmitting light wave guide and the received light wave guide are mutually optically separated, and the light axis of transmitting light is set by the positioning means so as to tilt with respect to the normal to the end face of the optical fiber; thus, it is possible to avoid the transmitting light from the transmitting light wave guide from entering the received light wave guide.

Therefore, the above-mentioned arrangement eliminates the need for expensive optical elements conventionally used, such as polarizing beam splitters and wavelength filters, separates the transmitting light and received light from each other, and carries out bidirectional optical communication simultaneously at low costs by using a single optical fiber.

In order to solve the above-mentioned problems, a bidirectional optical communication apparatus in accordance with the present invention is provided with: an optical fiber for transmitting signal light in a multi mode, and bidirectional optical communication devices that are respectively coupled to both of the end faces of the optical fiber, said bidirectional optical communication device being provided with a light-emitting element for generating signal light in accordance with a data signal, a light-receiving element for receiving the signal light and for generating a data signal in accordance with the signal light, a transmitting light wave guide for projecting transmission light that is the signal light from the light-emitting element to an optical fiber outside, and a received light wave guide for guiding received light that is signal light from the optical fiber outside, wherein: the transmitting light wave guide and the received light wave guide are mutually optically separated from each other, and at an area on each end face to which the transmitting light connected to the optical fiber is projected, the light axis of the transmission light is set so as to tilt with respect to the normal to the end face of the optical fiber.

In the above-mentioned arrangement, since the transmitting light wave guide and the received light wave guide are mutually optically separated, the above-mentioned arrangement eliminates the need for expensive optical elements conventionally used, such as polarizing beam splitters and wavelength filters, and carries out bidirectional optical communication simultaneously at low costs by using a simple system and a single optical fiber.

Moreover, in the above-mentioned arrangement, since the optical fiber transmits light in a multi-mode, the core diameter of the optical fiber can be made greater, for example, approximately 1 mm. Consequently, the above-mentioned arrangement makes it possible to easily couple the optical fiber and the bidirectional optical communication devices optically.

For a fuller understanding of the nature and advantages of the invention, reference should be made to the ensuing detailed description taken in conjunction with the accompanying drawings.

DESCRIPTION OF THE EMBODIMENTS

FIRST EMBODIMENT

Figure 12:
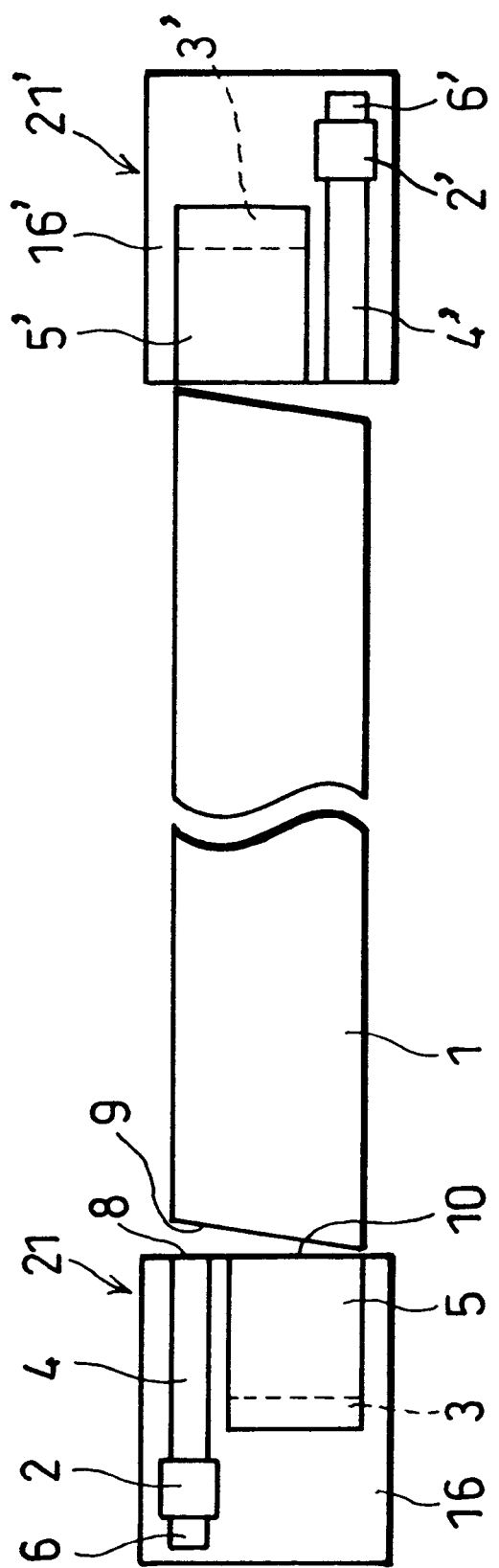
FIG. 12 is a schematic explanatory drawing that shows a bidirectional optical communication link in accordance with the first embodiment.

Referring to FIGS. 1 through 5 as well as FIG. 12, the following description will discuss the first embodiment of the present invention.

Figure 1:
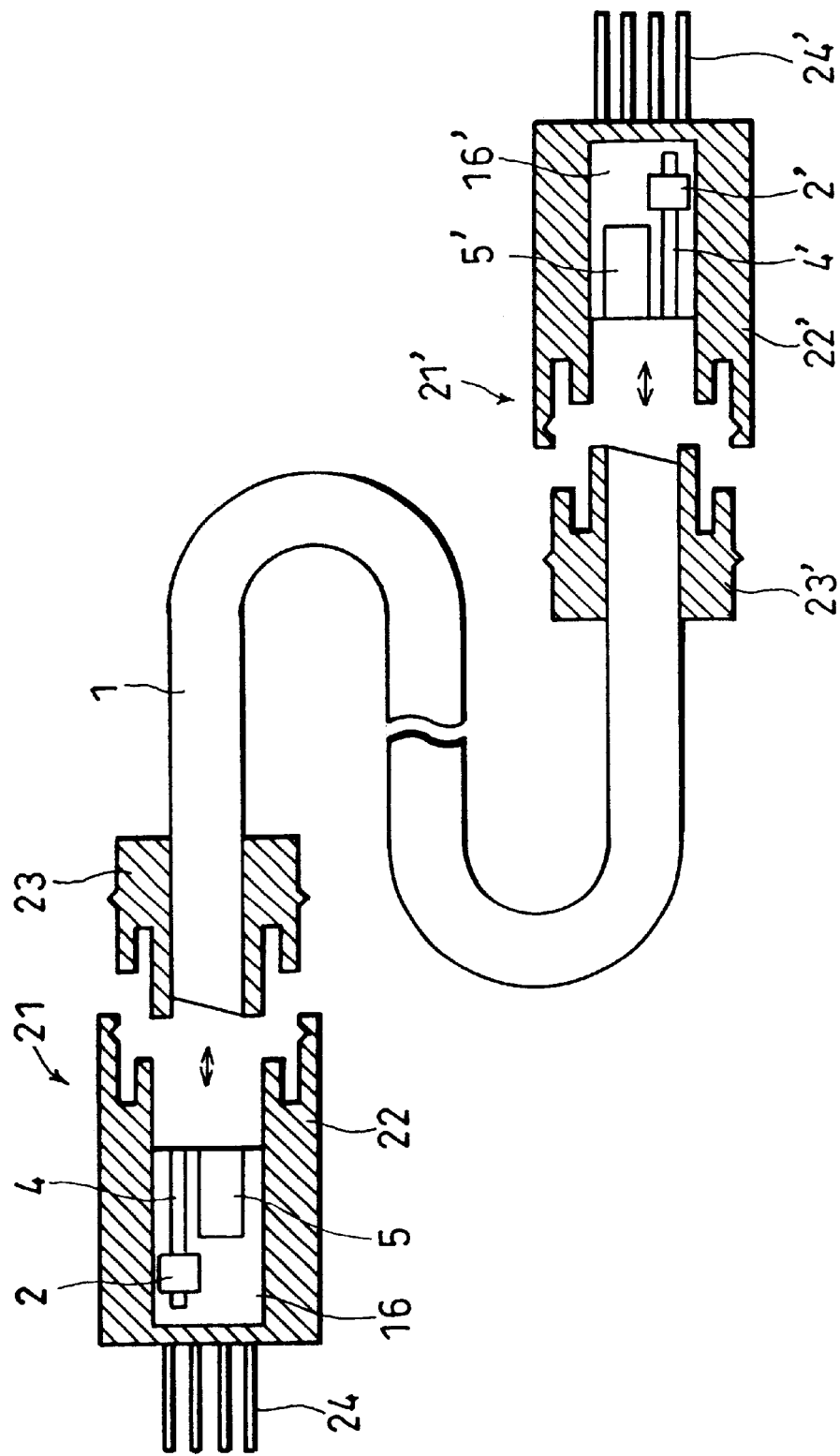
FIG. 1 is a schematic explanatory drawing that shows a bidirectional optical communication link in accordance with the first embodiment of the present invention.

As illustrated in FIG. 1 and FIG. 12, bidirectional optical communication modules (bidirectional optical communication devices) 21 and 21' of the present invention are optically coupled to both ends of an optical fiber 1 respectively, while being positioned through coupling between optical connector main bodies (positioning means) 22 and 22' and optical connector attach/detach sections (positioning means) 23 and 23', thereby forming a bidirectional optical communication link (bidirectional optical communication apparatus).

The above-mentioned optical communication modules 21 and 21' have the same functions respectively, and the following description will discuss the construction of one of the optical communication module 21. Moreover, with respect to the construction of the other optical communication module 21', those members having the same functions as the optical communication module 21 are indicated by applying a dash (') to the corresponding reference numerals of the optical communication module 21, and an explanation thereof is omitted.

The optical connector main body 22 is formed into a cylinder shape with a bottom and an opening on its one end, and optical members, such as a transmitting light wave guide 4 and a received light wave guide 5 which will be described later, are housed therein, with respective terminals 24 for inputting and outputting data signals or modulated signals derived from the data signals for the optical members being provided on the periphery of the bottom face.

Moreover, the optical connector main body 22 has a connecting section which is flexibly snap-fitted and connected to the tip of the optical connector attach/detach section 23 at the opening edge. With this arrangement, in the optical connector main body 22, since the end of the optical fiber 1 is secured to the optical connector attach/detach section 23, the connecting section makes it possible to set the end face of the optical fiber 1, at a predetermined position with respect to the transmitting light wave guide 4.

The optical connector attach/detach section 23, which has a cylinder shape, is set to be coaxial with respect to the end of the optical fiber 1, and designed so that the end face of the optical fiber 1 is exposed to the tip of the optical connector attach/detach section 23; thus, the optical fiber 1 is freely detachably attached to the optical connector main body 22 through the above mentioned snap fitting.

The optical fiber 1 is a flexible elongated cord which respectively transmits modulated light derived from data signals as transmitting light and received light. The optical communication module 21, which is optically coupled to the end face of the optical fiber 1 in the length direction, generates transmitting light and sends it to the optical fiber 1, and also generates data signal from received light released from the end face of the optical fiber 1.

Figure 2:
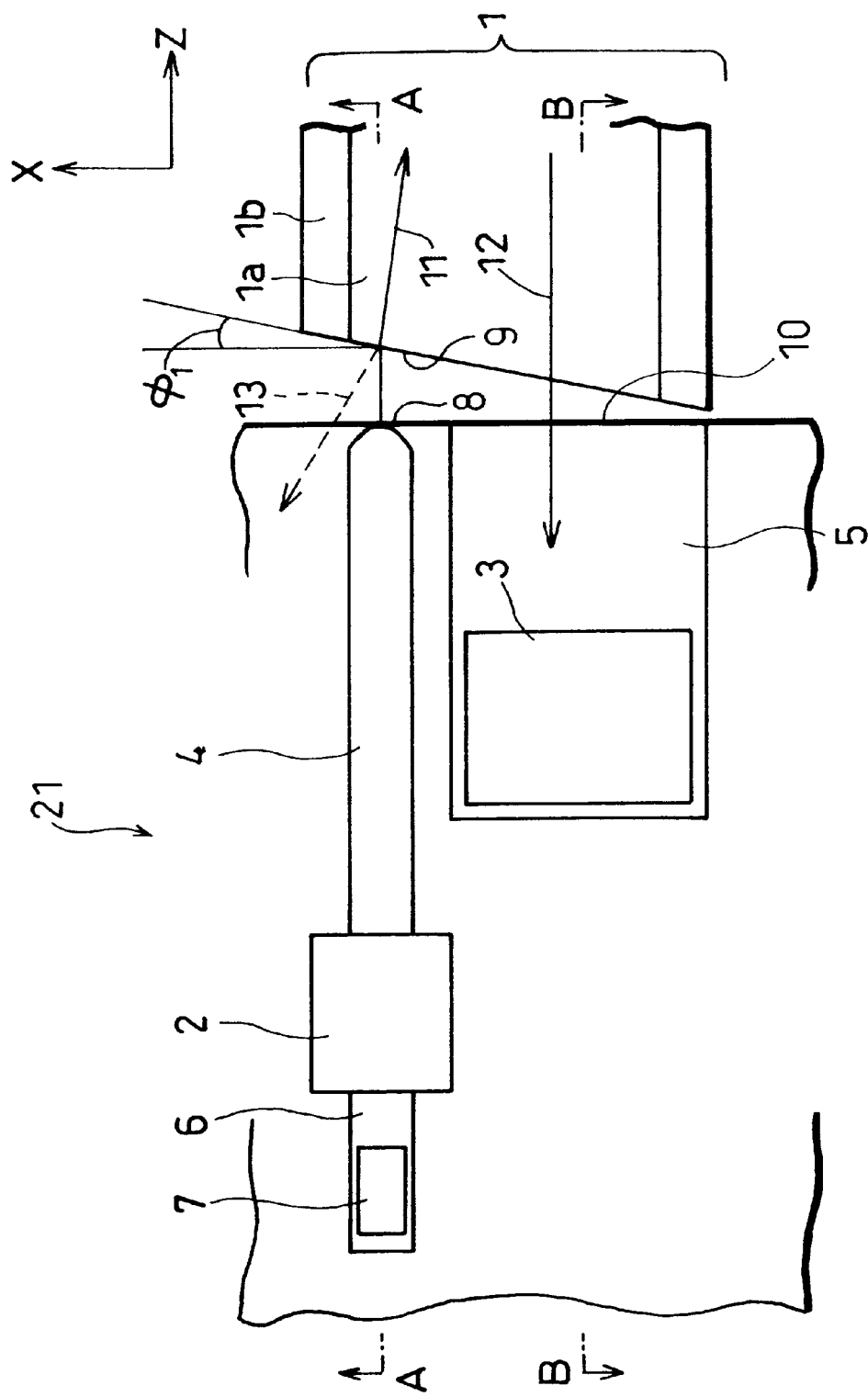
FIG. 2 is an explanatory drawing that shows an optical communication module of the above-mentioned bidirectional optical communication link.

The optical fiber 1 has a virtually round cross-section in a direction orthogonal to the length direction of the optical fiber 1, and as shown in FIG. 2 also, it has a light-transmitting core 1a at its center and clad 1b that covers the periphery of the core 1a. The refractive index of the core 1a is set to be greater than the refractive index of the clad 1b. Therefore, in the optical fiber 1, light, which is made incident on the end face of the optical fiber 1 and transmitted through the core 1a, is totally reflected by the border between the core 1a and the clad 1b; consequently, it can be transmitted with less transmission loss.

The optical communication module 21 is provided with a semiconductor laser (light-emitting element) 2, a photodiode (light-receiving element) 3, a transmitting light wave guide 4 and a received light wave guide 5. The transmitting light wave guide 4 is used for directing transmitting light released from the semiconductor laser 2 to the optical fiber 1. The received light wave guide 5 is used for directing received light released from the optical fiber 1 to the photodiode 3.

Each of the transmitting light wave guide 4 and received light wave guide 5 has a core section for transmitting light and a clad section for covering the peripheral face of the core section. The clad section serves to reduce the transmission loss of light by allowing light transmitted through the inside of the core section to be totally reflected by its border with the core section.

Here, the transmitting light wave guide 4 and the received light wave guide 5 are optically separated from each other. The optical separation of the transmitting light wave guide 4 and the received light wave guide 5 means that it is possible to avoid the light transmitted through the transmitting light wave guide 4 from being transmitted to the received light wave guide 5, and that even if one portion of the transmitting light released from the transmitting light wave guide 4 is reflected by the end face of the optical fiber 1, the reflected light is prevented from being made incident on the received light wave guide 5.

Since the transmitting light wave guide 4 and the received light wave guide 5 are optically separated from each other in this manner, the transmitting light wave guide 4 and the received light wave guide 5 are placed close to each other, as described below: The two wave guides 4 and 5 are respectively formed with a certain amount of distance (several tens $\mu$m) between each other so as to avoid mutual leakage light. Moreover, with respect to the two wave guides 4 and 5, an upper clad layer 19 and a light-shielding film 20, which will be described later, are installed on the transmitting light wave guide 4 and the received light wave guide 5. This ensures the optical separation between the two parts.

The above-mentioned semiconductor laser 2, transmitting light wave guide 4 and received light wave guide 5 are installed on a substrate 16 made of silicon, etc. The transmitting light wave guide 4 and the received light wave guide 5 are installed with their light axes in parallel with each other. Moreover, the transmitting light wave guide 4 is installed so that its light axis is aligned to a position deviated toward a radial direction with respect to the center axis of the end face of the optical fiber 1 facing the transmitting light wave guide 4 (dislocated, shifted position from the center axis), that is, an eccentric (off-centered) position. Moreover, an end face 8 on the releasing side of the transmitting light wave guide 4 and an end face 10 on the incident side of the received light wave guide 5 are designed to be flush with each other.

Figure 4:
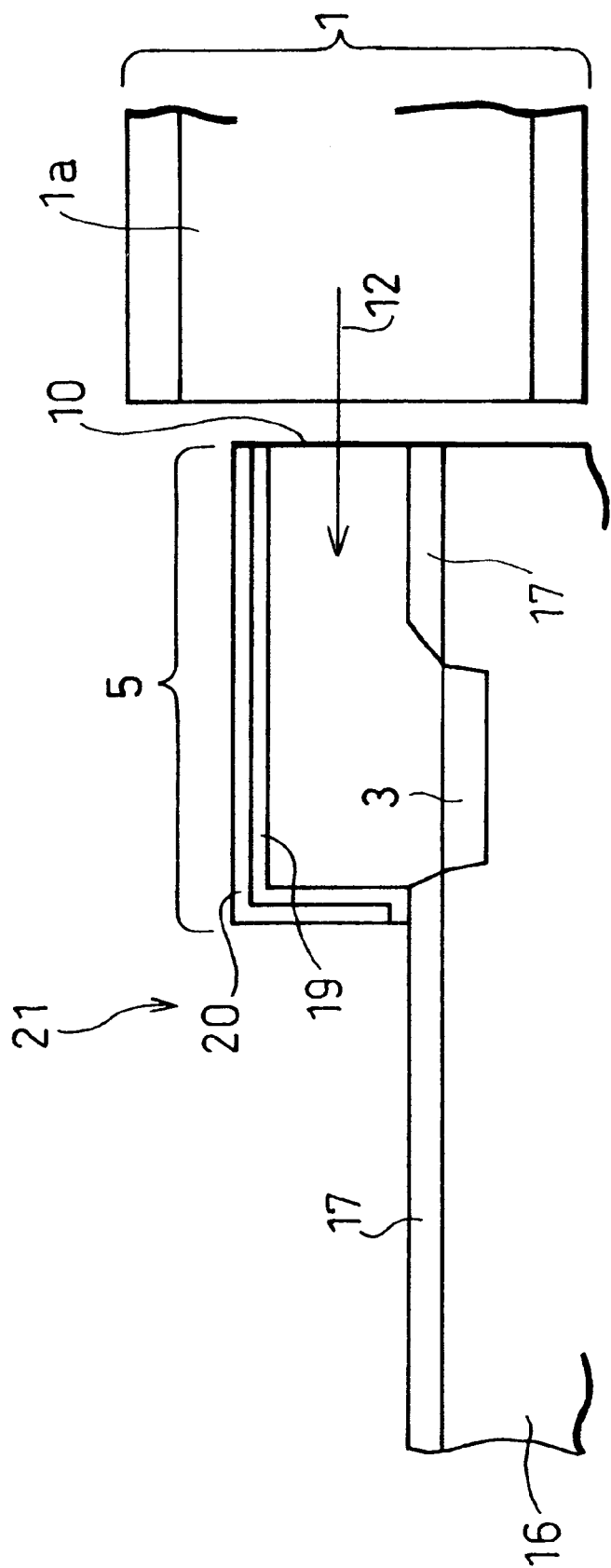
FIG. 4 is an explanatory drawing that shows a cross section of a received light wave guide, taken along line B—B of FIG. 2 in the optical communication module.

As illustrated in FIG. 4, the photodiode 3 is embedded in the substrate 16 so that the light-receiving face of the photodiode 3 comes into contact with or comes close to the side face (side portion) of the received light wave guide 5 with respect to the light axis direction of the received light 12 in a manner facing it, on the side opposite to the incident direction with respect to incident end face 10 of the received light from the optical fiber 1.

Figure 3:
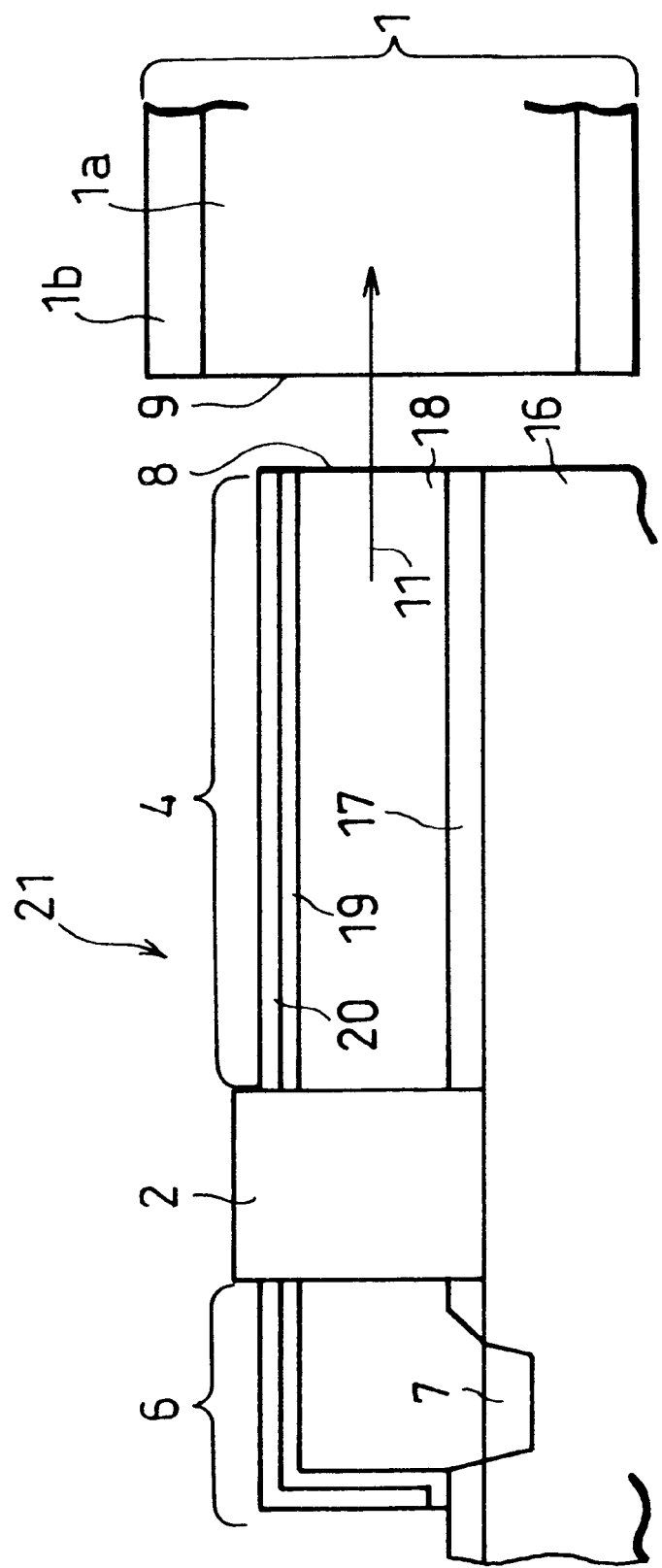
FIG. 3 is an explanatory drawing that shows a cross section of a transmitting light wave guide, taken along line A—A of FIG. 2 in the optical communication module.

As illustrated in FIG. 3, in the optical communication module 21, transmitting light 11, released from the semiconductor laser, is coupled to the transmitting light wave guide 4, transmitted through the transmitting light wave guide 4, and released from the end face 8 on the light-releasing side of the transmitting light wave guide 4. The transmitting light 11, released from the end face 8 on the light-releasing side, is coupled to the optical fiber 1 placed in close proximity to the end face 8 on the light-releasing side, transmitted through the optical fiber 1 and directed to the optical communication module 21' shown in FIG. 1 on the side opposite to the optical fiber 1. Moreover, light released from the other end face of the semiconductor laser 2 is directed to a monitor light wave guide 6, and detected by a monitor photodiode 7 so as to be used for adjusting the output of the semiconductor laser 2.

As illustrated in FIG. 4, in the optical communication module 21, received light 12, released from the optical fiber 1, is coupled to the received light wave guide 5, transmitted through the received light wave guide 5, and detected by the photodiode 3 facing the side portion of the received light wave guide 5. Thus, in the optical communication module 21, it is possible to obtain an electric signal corresponding to the data signal in accordance with changes in the light intensity of the received light 12. This electric signal is decoded to the data signal by a decoder, not shown, thereby completing the data communication.

As one example of a method for optically separating the transmitting light wave guide 4 and the received light wave guide 5 from each other, as illustrated in FIG. 2, the end face 9 of the light incident area for the transmitting light 11 from the transmitting light wave guide 4 in the optical fiber 1 is designed to tilt with a tilt angle $\phi_1$ from a face (hypothetical face) orthogonal to the center axis of the optical fiber 1 that faces the end face 9 of the light incident area for the transmitted light.

The tilt angle $\phi_1$ is provided so that, even when one portion of the transmitting light 11 released from the transmitting light wave guide 4 is reflected by the end face 9 of the light incident area of the optical fiber 1 to form reflected light 13, it is possible to avoid the reflected light 13 from being made incident on the received light wave guide 5.

With this arrangement, since the reflected light 13 derived from the transmitting light 11 released from the semiconductor laser 2 is prevented from being made incident on the photodiode 3 within the same optical communication module 21, it becomes possible to bidirectionally carry out optical communication simultaneously with high reliability in a stable manner.

In this arrangement, in the case when waveform multiplex communication for higher-density data communication is not required, the characteristics of the optical communication modules 21 and 21', which are connected to both sides of the optical fiber 1, are made identical to each other, and expensive optical elements, such as polarizing beam splitters and wavelength filters, which have been conventionally used for achieving bidirectional optical communication, can be omitted; therefore, it is possible to provide bidirectional optical communication links at low costs.

Here, when the end face 8 on the light-releasing side of the transmitting light wave guide 4 is provided as a flat face, the transmitting light 11 is diverged and scattered upon release from the transmitting light wave guide 4. This divergent angle (the largest among angles made by diverged light rays with respect to the light axis) is determined by the construction of the transmitting light wave guide 4, that is, mainly by the difference of refractive indexes between the core section and the clad section of the transmitting light wave guide 4. When the divergent angle of the transmitting light 11 is greater than the tilt angle $\phi_1$ of the end face 9 of incident area, one portion of the reflected light from the end face 9 of the incident area is coupled to the received light wave guide 5. Therefore, it is preferable to set the tilt angle $\phi_1$ greater than the divergent angle of the transmitting light 11 in order to avoid the above-mentioned coupling.

Normally, the divergent angle of the transmitting light 11 cannot be set so small, and is set to several ten degrees; therefore, it is preferable to set the tilt angle $\phi_1$ of the end face 9 of incident area to not less than the divergent angle. However, when the tilt angle $\phi_1$ is set greater, the reflection of the transmitting light 11 from the end face 9 of incident area also increases, resulting in degradation in the efficiency of light use. Therefore, there is a limitation in setting the tilt angle $\phi_1$ greater.

Moreover, when the transmitting light 11 is divergent light, the area of the region on which the transmitting light 11 is made incident in the end face 9 of incident area of the optical fiber 1, is wider than the end face 8 on the light-releasing side of the transmitting light wave guide 4. Here, when an attempt is made to set the coupling efficiency of the transmitting light 11 higher, it is preferable that, taking the divergence of the transmitting light 11 into consideration, the position of the transmitting light wave guide 4 is brought closer to the light axis of the optical fiber 1 in accordance with the divergence. However, such a setting narrows the width (the length in a direction orthogonal to the light axis direction) of the received light wave guide 5, resulting in the corresponding reduction in the coupling efficiency of the received light 12.

Figure 5:
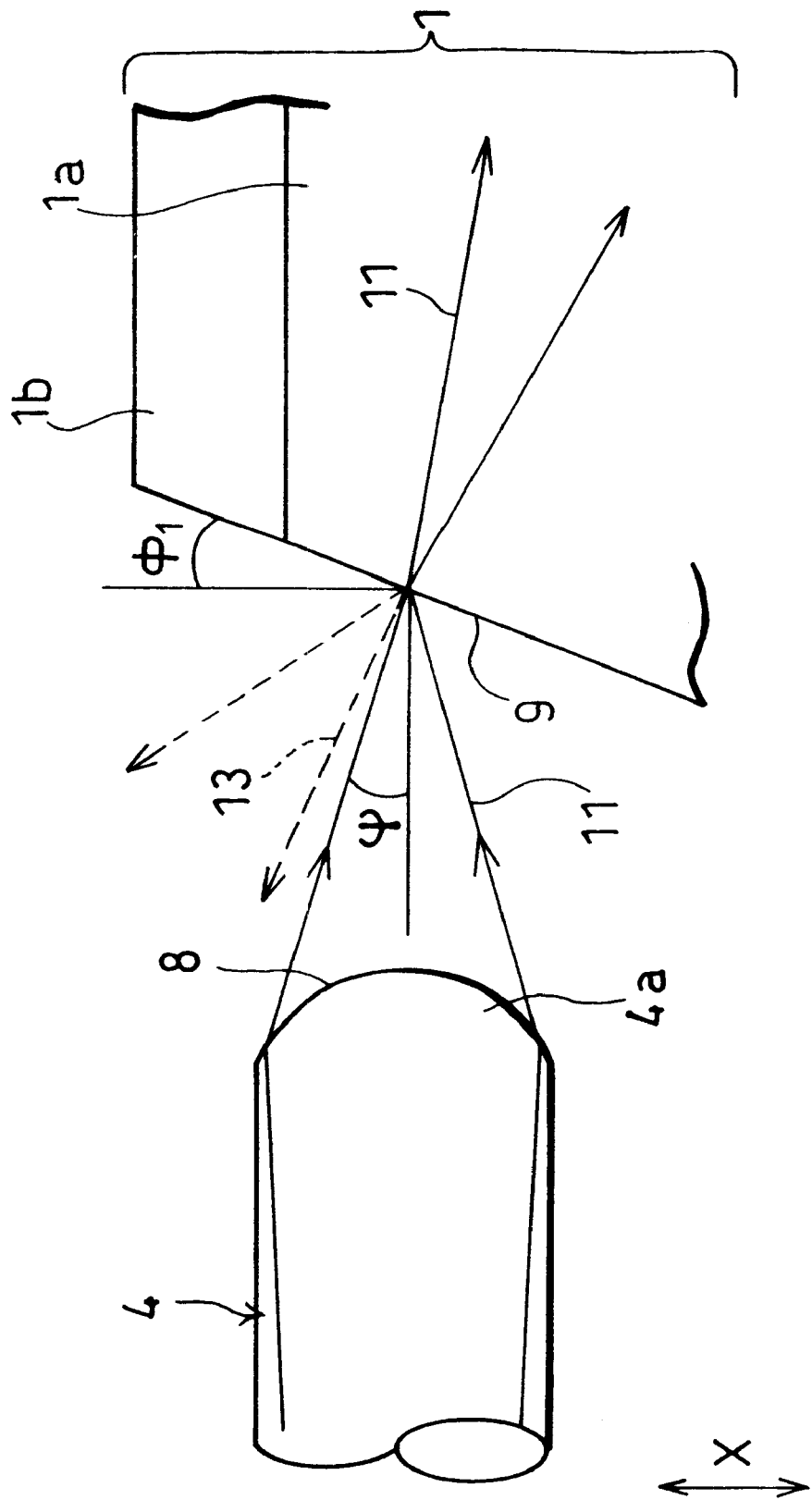
FIG. 5 is an explanatory drawing that shows connections among the transmitting light wave guide, the received light wave guide and the optical fiber.

In order to avoid the above-mentioned problem, as illustrated in FIG. 5, a lens section (converging means) 4a, which is formed by a convex lens, is installed at the end face 8 on the light-releasing side of the transmitting light wave guide 4. This lens section 4a makes it possible to reduce the divergent angle of the transmitting light 11 released from the end face 8 on the light-releasing side, and also to converge the transmitting light 11 onto the end face 9 of the light-incident area. Consequently, since the tilt angle $\phi_1$ of the end face 9 of the light-incident area of the optical fiber 1 is set smaller, the efficiency of light use can be improved.

In particular, when the transmitting light 11 is converged by the lens section 4a so as to make the angular aperture $\phi$ (the angle formed between a light ray passing through an outer edge of the lens section 4a and the light axis) smaller than the tilt angle $\phi_1$ of the optical fiber 1, it is possible to prevent the reflected light from the end face 9 of the light-incident area of the optical fiber 1 from being coupled to the received light wave guide 5. Since the angular aperture $\phi$ can be set in a wide range by shaping operations of the lens section 4a, the tilt angle $\phi_1$ can be made further smaller by setting the angular aperture $\phi$ appropriately.

Although it requires slightly time consuming tasks to form the lens section 4a with a spherical face at the end face 8 on the light-releasing side of the transmitting light wave guide 4, it is only necessary to prevent the reflected light from the end face 9 of the light-incident area of the optical fiber 1 from being made incident on the received light wave guide 5 that is aligned in the X-direction (a direction orthogonal to the center axis of the optical fiber 1) with respect to the transmitting light wave guide 4. For this reason, a cylindrical lens, which has a convex face outward only in the X-direction with lens effects (light-converging effect) exerted in the X-direction, may be used as the lens section 4a of the end face 8 on the light-releasing side.

The lens section 4a, provided as such a cylindrical lens, is easily manufactured as follows: upon formation of the transmitting light wave guide 4 and the received light wave guide 5, one portion of a pattern of a mask used for patterning, that is a portion corresponding to the end face 8 on the light-releasing side, is formed into a convex shape outward.

With respect to the optical fiber 1, multi-mode glass optical fibers and plastic optical fibers may be used. In particular, since the plastic optical fibers have larger core diameters ranging from 0.2 to 1.0 mm, they provide easy positioning in making connections to the transmitting light wave guide 4 and the received light wave guide 5, and the production cost of plastic optical fibers is not expensive.

In order to increase the coupling efficiency from the optical fiber 1 to the received light wave guide 5, since it is preferable to increase the core section size of the received light wave guide 5, high polymer materials, which allow easy formation of thick films, are preferably used for the core material of the received light wave guide 5. With respect to the core material of the transmitting light wave guide 4, the smaller the size thereof as compared with the core 1a of the optical fiber 1, the wider the permissible range for dislocation. For this reason, it is preferable to make the transmitting light wave guide 4 as thin as possible and also to make the received light wave guide 5 as thick as possible.

Here, the transmitting light wave guide 4 and the optical fiber 1 are positioned with each other so that the transmitting light 11 is coupled to the core 1a at a position close to the periphery of the core 1a having a round shape at cross section orthogonal to the light-axis direction of the optical fiber 1, that is, at a position close to the clad 1b covering the periphery of the core 1a, away from the center axis of the core 1a; thus, since the light-receiving area of the received light wave guide 5 can be made greater, the coupling efficiency from the optical fiber 1 to the received light wave guide 5 is improved.

In addition to the reflected light from the end face 9 of the light-incident area of the optical fiber 1, leakage light from the transmitting light being transmitted through the transmitting light wave guide 4, leakage light from the output light from the semiconductor laser 2, etc. are made incident on the photodiode 3, resulting in degradation in the SN ratio in an electric signal (data signal) reproduced based upon the received light from the received light wave guide 5.

In order to solve this problem, as illustrated in FIG. 4, the present invention provides an upper clad layer 19 and a light-shielding film 20 which cover the side walls and upper portion of the received light wave guide 5, so as to prevent the above-mentioned leakage light from being made incident on the photodiode 3 installed in close proximity thereof on the substrate 16. By the use of such upper clad layer 19 and light-shielding film 20, light is coupled only from the incident end face 10 which is an end face on the coupling side to the optical fiber 1, and it becomes possible to prevent light incident from the other portions.

Moreover, the side walls and upper portions (that is, the end face on the opposite side to the substrate 16) of the transmitting light wave guide 4 and the monitor light wave guide 6 are covered with the light-shielding film 20 with respect to portions other than the end face on the semiconductor laser coupling side and the end face on the optical fiber coupling side; thus, the influences of the leakage light can be further reduced by the light-shielding film 20. Consequently, the application of the light-shielding film 20 makes it possible to further improve the SN ratio.

In the optical communication module 21 of the present invention, onto the substrate 16 in which the monitor photodiode 7, and a light-receiving photodiode 3 are formed in an embedded manner, the semiconductor laser 2, the transmitting light wave guide 4 and the received light wave guide 5 are integrated by using a semiconductor process. Therefore, as compared with conventional optical communication modules which are made by assembling individual parts with considerable bulk that have been separately manufactured, the above-mentioned arrangement achieves considerable miniaturization and mass production at low costs.

SECOND EMBODIMENT

Figure 6:
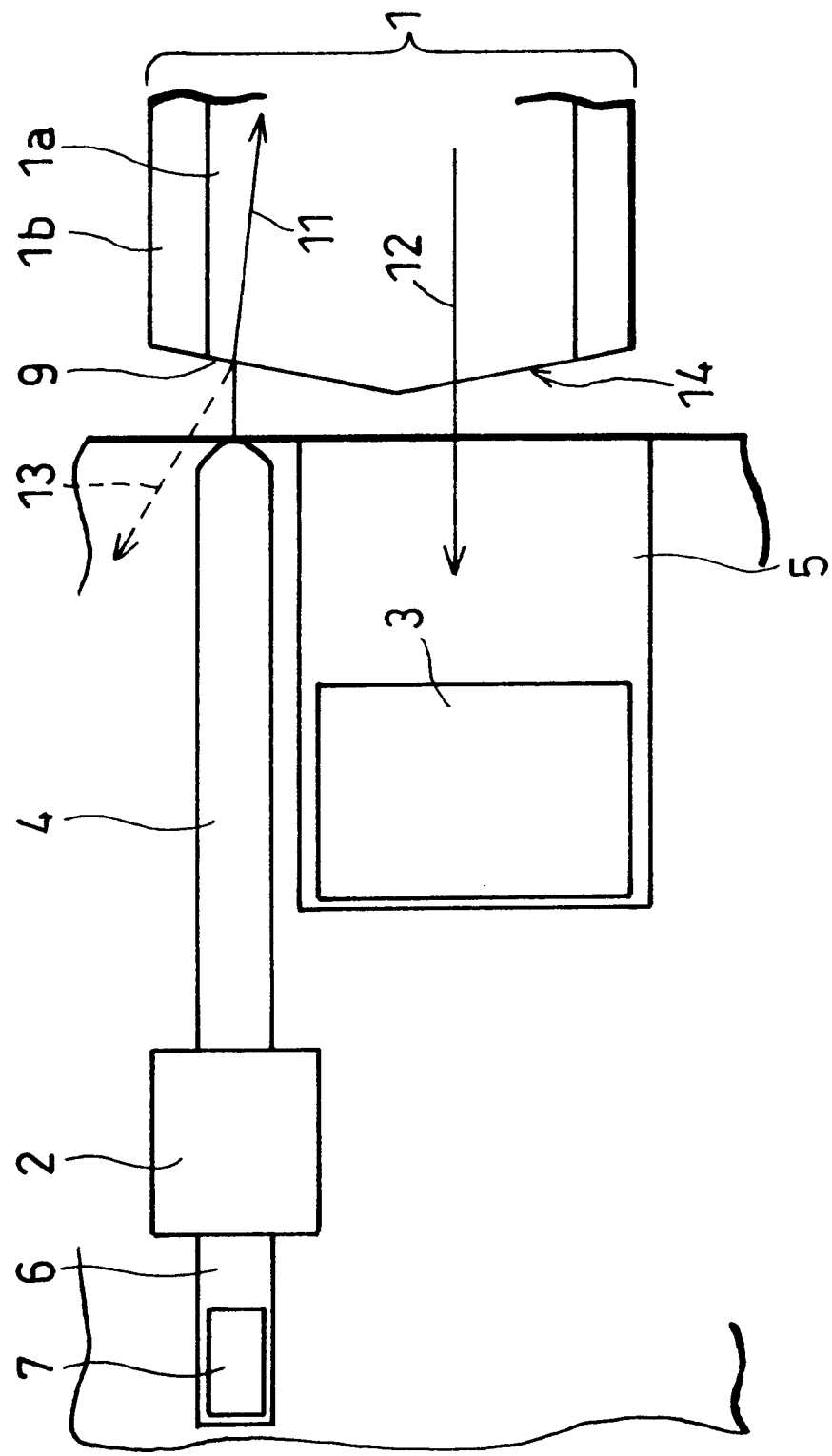
FIG. 6 is a schematic explanatory drawing that shows a bidirectional optical communication link in accordance with the second embodiment of the present invention.

Referring to FIG. 6, the following description will discuss a bidirectional optical communication link in accordance with the second embodiment of the present invention. This bidirectional optical communication link is different from that of the first embodiment in that the entire end face of the optical fiber 1 facing the optical communication module 21 is shaped into a conical end face 14; however, the other arrangements except the above point are the same as those of the first embodiment. Therefore, those members that have the same functions in the first embodiment are indicated by the same reference numerals and the description thereof is omitted.

In such a conical end face 14, its center axis is made coincident with, for example, the center axis of the optical fiber 1 so that even if one portion of the transmitting light 11 from the transmitting light wave guide 4 is reflected, it is possible to prevent the reflected light 13 from forming stray light. Therefore, the conical end face 14 has a tilt angle $\phi_1$ on the end face 9 of the light-incident area in the same manner as the first embodiment, and even if one portion of the transmitting light 11 from the transmitting light wave guide 4 is reflected, it becomes possible to prevent the reflected light 13 from forming stray light.

Here, the first embodiment has a problem in which, if the optical fiber 1 is rotated centered on the central axis thereof, the reflected light 13 from the end face 9 of the light-incident area of the transmitting light 11 from the transmitting light wave guide 4 is made incident on the received light wave guide 5 as stray light. This results in time consuming tasks of connecting the optical fiber 1 to the optical communication module 21 while taking into consideration the direction of tilt of the end face 9 of the light-incident area of the optical fiber 1.

However, in the conical end face 14, even if the optical fiber 1 is rotated, the tilt angle of the end face 9 of the light-incident area on which the transmitting light 11 is made incident is maintained constant so that no change in the direction of the reflected light 13 occurs on the end face 9 of the light-incident area.

Thus, the second embodiment makes it possible to prevent the reflected light 13 from entering the received light wave guide 5 independent of the rotatable fixing position between the optical communication module 21 and the optical fiber 1; therefore, the optical fiber 1 and the optical communication module 21 can be connected to each other without the need for taking into consideration the direction of tilt of the end face 9 of the light-incident area, and consequently to reduce tasks required for the connection.

THIRD EMBODIMENT

Figure 7:
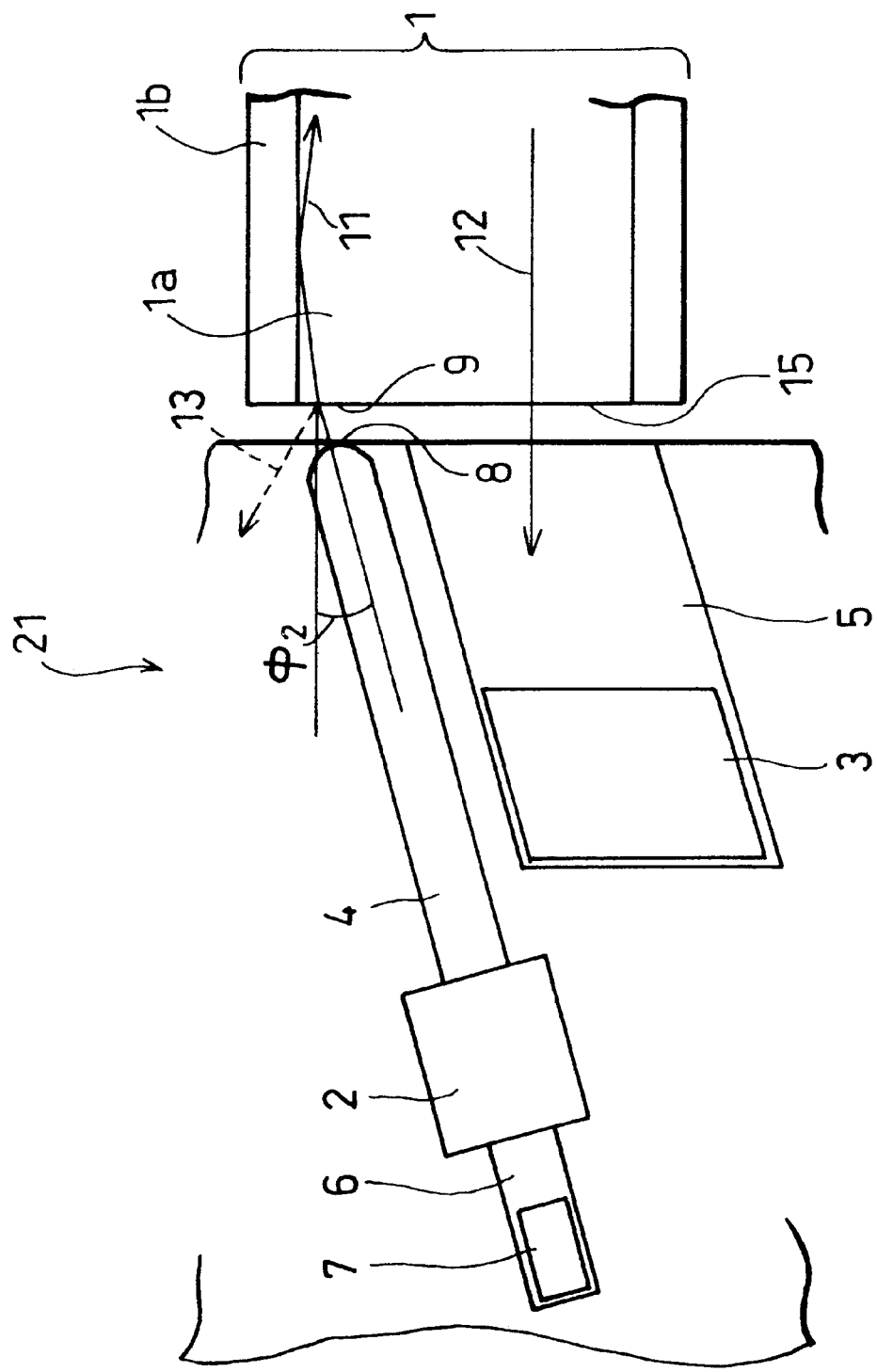
FIG. 7 is a schematic explanatory drawing that shows a bidirectional optical communication link in accordance with the third embodiment of the present invention.
Figure 8:
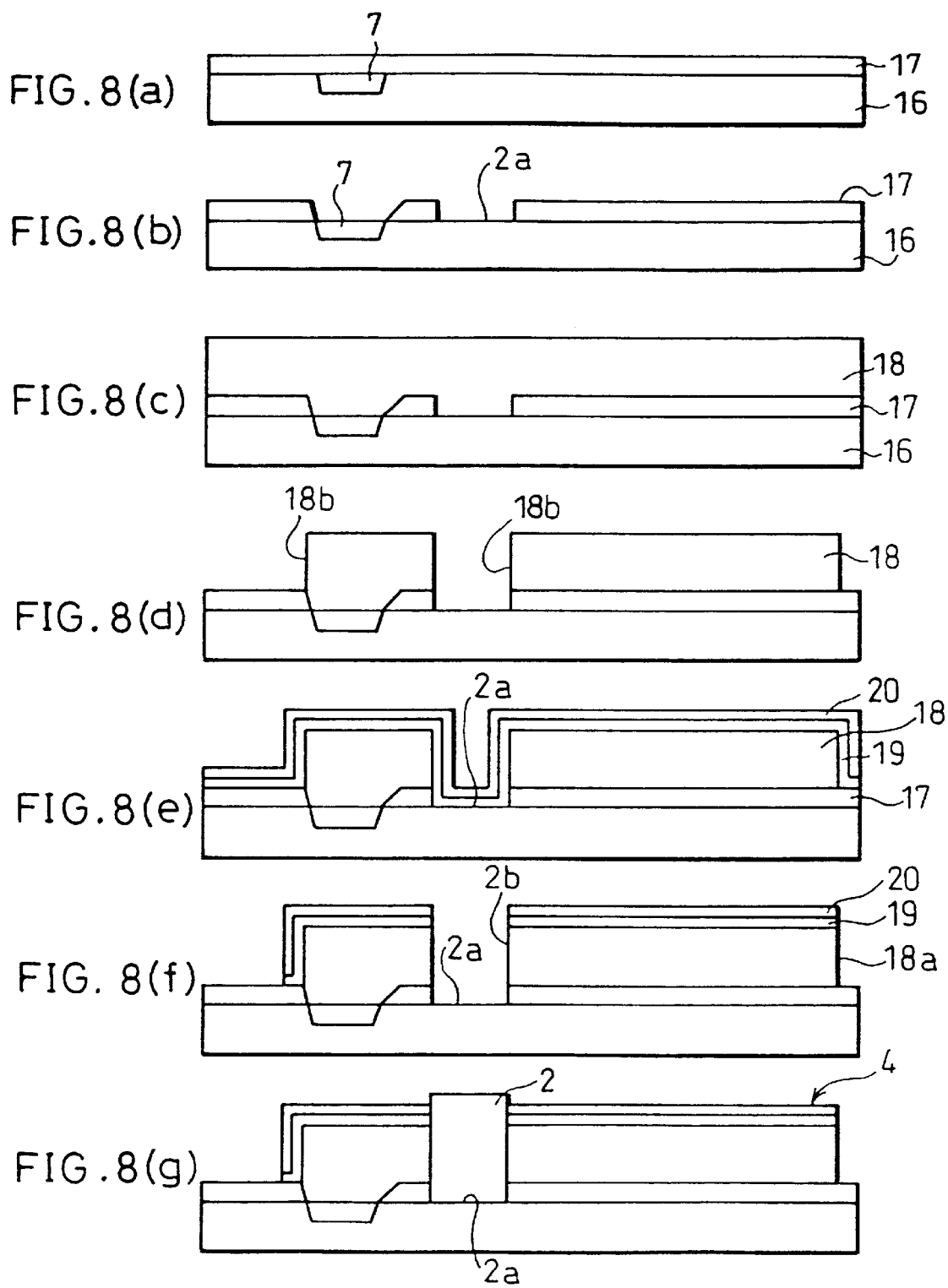
FIGS. 8(a) through 8(g) are explanatory drawings that show essential processes in the manufacturing processes of the optical communication module.
Figure 9:
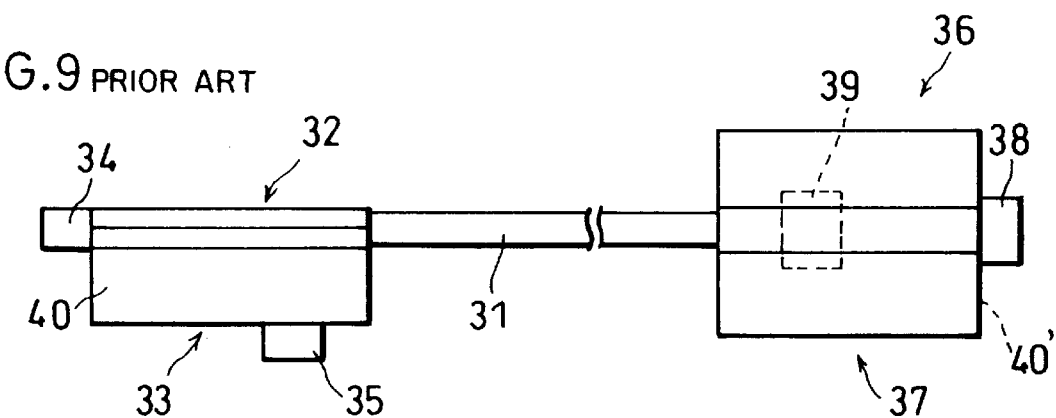
FIG. 9 is a schematic front view showing a bidirectional optical communication link of the first prior art.
Figure 10:
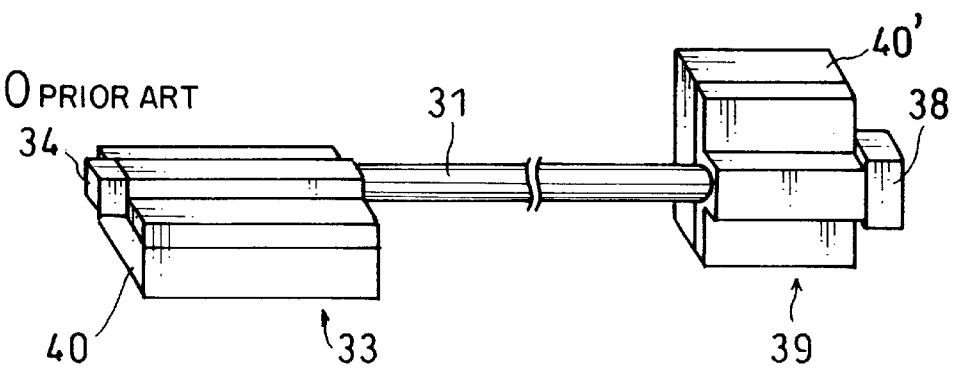
FIG. 10 is a perspective view showing the above-mentioned bidirectional optical communication link.
Figure 11:
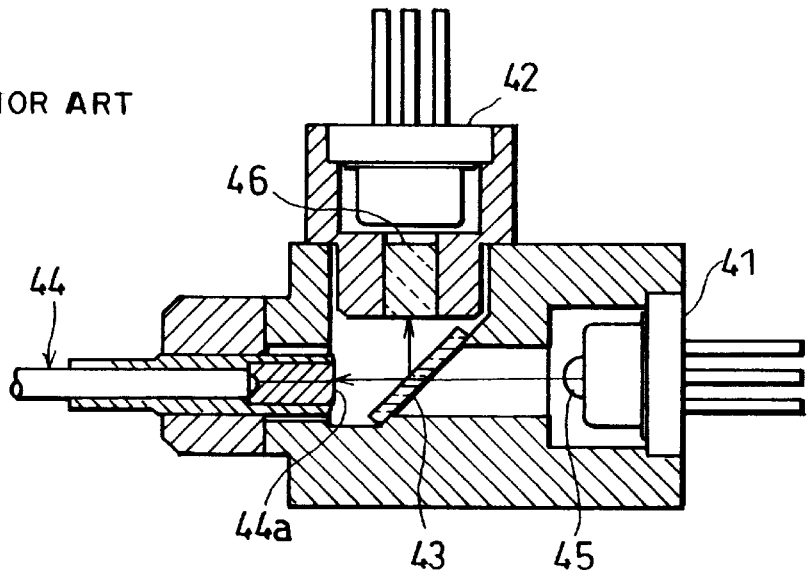
FIG. 11 is a cross-sectional view that shows an optical communication module used in a bidirectional optical communication link of the second prior art.
Figure 13:
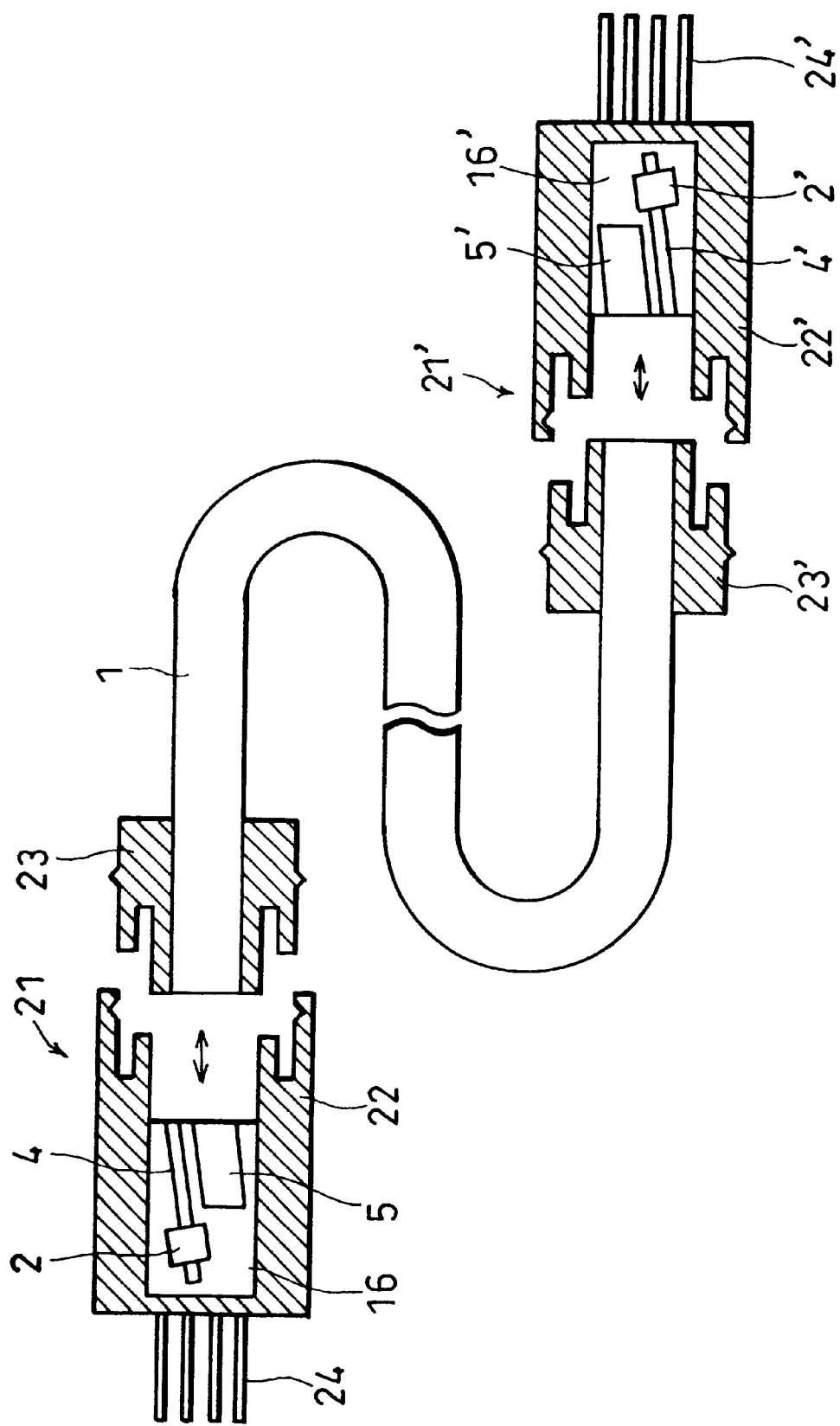
FIG. 13 is a schematic explanatory drawing that shows a bidirectional optical communication link in accordance with the third embodiment.

Referring to FIGS. 7, 8 and 13, the following description will discuss a bidirectional optical communication link in accordance with the third embodiment of the present invention. As illustrated in FIGS. 7 and 13, the end face 15 of the optical fiber 1, which faces the transmitting light wave guide 4 and the received light wave guide 5, is orthogonal to the center axis of the optical fiber 1, while the light axis of the transmitting light 11 from the transmitting light wave guide 4 is set so as to tilt with respect to the center axis of the optical fiber 1; thus, even if one portion of the transmitting light 11 from the transmitting light wave guide 4 is reflected from the end face 9 of the light-incident area of the optical fiber 1, it is possible to prevent the reflected light 13 from being made incident on the received light wave guide 5 as stray light. This embodiment is distinct from the first embodiment in this point.

The other arrangements except the above point are the same as those of the first embodiment; therefore, those members that have the same functions in the first embodiment are indicated by the same reference numerals and the description thereof is omitted.

In the third embodiment, the angle $\phi_2$ between the light axis of the transmitting light 11 from the transmitting light wave guide 4 and the center axis of the optical fiber 1 is set so that the reflected light 13 of the transmitting light 11 at the end face 9 of the light-incident area is not made incident on the received light wave guide 5; therefore, in the same manner as the second embodiment, even if the optical fiber 1 is rotated, the tilt angle to the transmitting light 11 is maintained constant on the end face 9 of the incident area on which the transmitting light is incident so that no change in the direction of the reflected light 13 occurs on the end face 9 of the light-incident area.

Moreover, in the third embodiment, since the optical axis of the transmitting light 11 is allowed to tilt with respect to the center axis of the optical fiber 1, there is a possibility that the transmitting light 11 may fail to be couple to the optical fiber 1 in the case of a great distance between the end face 8 on the light-releasing side of the transmitting light wave guide 4 and the end face 9 of the light-incident area of the optical fiber 1. Therefore, in the third embodiment, it is preferable to set the distance between the end face 8 on the light-releasing side and the end face 9 of the light-incident area as small as possible so that the center light axis of the transmitting light 11 is made incident on the end face 9 of the light-incident area within a core 1a area.

Next, referring to FIGS. 8(*a*) through 8(*g*), an explanation will be given of a manufacturing method of the optical communication module 21 of the above-mentioned embodiments. FIGS. 8(*a*) through 8(*g*) are cross-sectional views showing respective manufacturing processes of the transmitting light wave guide. The received light wave guide is also simultaneously made through the same sequence of processes as the transmitting light wave guide.

As illustrated in FIG. 8(*a*), a photodiode, monitor photodiode 7 and a signal detection circuit used for these, not shown, are formed on a substrate 16 by using a semiconductor manufacturing process. successively, on this is formed a buffer layer 17 for an optical wave guide. With respect to the material for the buffer layer 17, for example, $SiO_2$, etc., which has a refractive index lower than the refractive index of a core material, which will be described later, may be used. The upper surface of the buffer layer 17 is smoothed by polishing.

Next, as illustrated in FIG. 8(*b*), photolithography and etching processes are carried out so that the buffer layer 17 on the photodiodes 3 and 7 and on a fixing position 2*a* for a semiconductor laser 2 to be placed later is removed.

Then, as illustrated in FIG. 8 (*c*), a light-transmitting plastic layer 18, which serves as a core for the light wave guide, is formed on the substrate 16 and the buffer layer 17. For example, polyimide, etc. may be used as a material for this plastic layer 18, and the thickness of the plastic layer 18 is set, for example, at approximately 100 μm.

Next, as illustrated in FIG. 8(*d*), photolithography and etching processes are carried out so that the plastic layer 18 is removed from clearance portions 18*b* except the transmitting light wave guide, the received light wave guide and the monitor wave guide for light released from the semiconductor laser. With respect to the etching method, reactive ion etching and excimer laser etching may be used.

Thereafter, as illustrated in FIG. 8 (*e*), an upper clad layer 19 is formed on the residual plastic layer 18, the fixing position 2*a* for the semiconductor laser and buffer layer 17, and on this is further formed a light-shielding film 20. With respect to a material for the upper clad layer 19, for example, $SiO_2$, etc., which has a refractive index lower than the refractive index of the core material as described above, may be used. With respect to a material for the light-shielding film 20, for example, aluminum, etc., which exhibits a light shielding property by reflecting light, may be used.

Next, as illustrated in FIG. 8(*f*), photolithography and etching processes are carried out so that the end face 2*b* on the semiconductor laser coupling side of the light wave guide that is a residual plastic layer 18, the upper clad layer 19 of the end face 18*a* on the optical fiber coupling side and the light-shielding layer 20 are respectively removed.

Lastly, as illustrated in FIG. 8(*g*), the semiconductor laser 2 is bonded to the fixing position 2*a* of the semiconductor laser, thereby completing the transmitting light wave guide 4. Here, the received light wave guide 5 is manufactured in the same manner as the transmitting light wave guide 4, and they can be manufactured simultaneously at one time by using the above-mentioned semiconductor manufacturing process. Additionally, in the bidirectional optical communication module as described above, formation of the respective layers may be carried out by using various methods, such as sputtering method, CVD method, vapor deposition method and spin coating method, depending on materials to be used.

As described above, the bidirectional optical communication device of the present invention is provided with a transmitting light wave guide and a received light wave guide, used for bidirectional optical communication, and a positioning means for positioning the transmitting light wave guide, wherein the transmitting light wave guide and the received light wave guide are mutually optically separated from each other, and the light axis of the transmission light is set so as to tilt with respect to the normal to the end face of the optical fiber.

Therefore, the above-mentioned arrangement eliminates the need for expensive optical elements, such as polarizing beam splitters and wavelength filters, by optically separating the transmitting light wave guide and the received light wave guide from each other, and carries out bidirectional optical communication simultaneously by using a single optical fiber at low costs.

In the bidirectional optical communication device, the cross-sectional area in a direction orthogonal to the light axis of the received light wave guide is preferably set to be greater than the cross-sectional area in a direction orthogonal to the light axis of the transmitting light wave guide.

With the above-mentioned arrangement, the width (the length in a direction orthogonal to the light axis direction) of the received light wave guide that is coupled to the light-emitting element is narrowed so that the received light wave guide that is coupled to the light-receiving element is set wider, and so that the position of the transmitting light wave guide is dislocated from the center axis of the optical fiber; consequently, it becomes possible to improve the coupling efficiency of light to be coupled from the optical fiber to the received light wave guide.

In the above-mentioned bidirectional optical communication device, the center light axis of the transmitting light is preferably set so as to pass through the proximity of the core outer edge within the core on the end face of the optical fiber for transmitting signal light.

With the above-mentioned arrangement, the position of the transmitting light wave guide is dislocated from the center axis of the optical fiber so that it becomes possible to improve the coupling efficiency of light to be coupled from the optical fiber to the received light wave guide.

The above-mentioned bidirectional optical communication device is preferably provided with a light-converging means for reducing the diffusion of transmitting light from the transmitting light wave guide.

With the above-mentioned arrangement, since the light-converging means is installed on the end face on the optical fiber side of the transmitting light wave guide, the diffusion of transmitting light released from the transmitting light guide path can be reduced by the light-converging means. Therefore, it is possible to improve the coupling efficiency of the transmitting light that is to be coupled from the transmitting light wave guide to the optical fiber for transmitting signal light.

In the above-mentioned bidirectional optical communication device, the light-converging means is preferably designed as a lens made by shaping the light-releasing face for the transmitting light in the transmitting light wave guide into a curved face.

With the above-mentioned arrangement, since the light-converging means is a lens made by shaping the light-releasing face into a curved face, it is possible to form the light-converging means easily, and also to simplify the formation of the light-converging means.

In the above-mentioned bidirectional optical communication device, the light-converging means is preferably provided as a cylindrical lens which exhibits a light-converging function in a direction in which the transmitting light wave guide and the received light wave guide are aligned with each other.

With the above-mentioned arrangement, since the light-converging means is provided as a cylindrical lens which exhibits a light-converging function in a direction in which the transmitting light wave guide and the received light wave guide are aligned with each other, it is possible to reduce time-consuming tasks to form more curved faces than are required. Therefore, the above-mentioned arrangement makes it possible to form the light-converging means more easily, and also to further simplify the formation of the light-converging means.

Moreover, in the above-mentioned bidirectional light communication device, an angle, formed by the light axis of the transmitting light converged by the light-converging means and the normal to the face of the area to which the transmitting light is directed on the end face of the optical fiber for transmitting signal light, is preferably set so as to be greater than the angular aperture of the transmitting light converged by the light-converging means.

With the above-mentioned arrangement, the angle, formed by the light axis of the transmitting light converged by the light-converging means and the normal to the face of the area to which the transmitting light is directed, is designed to be greater than the angular aperture of the converged transmitting light; therefore, it becomes possible to optically separate the transmitting light wave guide and the received light wave guide from each other.

Moreover, in the above-mentioned bidirectional light communication device, each of the core sections of the transmitting light wave guide and the received light wave guide may be formed of a high polymer material.

With the above-mentioned arrangement, the application of a high polymer material to the transmitting light wave guide and the received light wave guide makes it possible to form the thick films of the transmitting light wave guide and the received light wave guide more easily at low costs.

Furthermore, in the bidirectional optical communication device, it is preferable to form an upper clad layer and a light-shielding film on the respective core sections of the transmitting light wave guide and the received light wave guide so as to prevent stray light from entering the light-receiving element.

With the above-mentioned arrangement, since the buffer layer and also the light-shielding film are formed on the transmitting light wave guide and the received light wave guide, it is possible to prevent leakage light from the transmitting light wave guide from entering the received light wave guide.

The above-mentioned bidirectional optical communication device is preferably provided with a silicon substrate on which the light-receiving element is formed and the light-emitting element, the transmitting light wave guide and the received light wave guide are integrally assembled.

With the above-mentioned arrangement, on the silicon substrate in which the light-receiving element and the signal circuit has been incorporated are integrally assembled the light-emitting element, the transmitting light wave guide and the received light wave guide; therefore, for example, semiconductor processes can be used so that miniaturization and mass production at low costs are achieved.

As described above, the bidirectional optical communication apparatus of the present invention is provided with an optical fiber for transmitting signal light and the above-mentioned bidirectional optical communication devices optically coupled to the respective ends of the optical fiber.

With the above-mentioned arrangement, since the transmitting light wave guide and the received light wave guide are optically separated from each other, it is possible to eliminate the need for expensive optical elements, such as polarizing beam splitters and wavelength filters, and also to carry out bidirectional optical communication simultaneously by using a single optical fiber at low costs.

In the above-mentioned bidirectional optical communication apparatus, each of the end faces of the optical fiber is preferably designed so as to intersect (cross or tilt) a hypothetical face that is orthogonal to the light axis of the optical fiber.

With the above-mentioned arrangement, since each of the end faces of the optical fiber is designed so as to intersect a hypothetical face that is orthogonal to the light axis of the optical fiber, it is possible to ensure the optical separation between the transmitting light wave guide and the received light wave guide more easily.

Moreover, in the above-mentioned bidirectional optical communication apparatus, the light axis of the transmitting light wave guide is preferably designed so as to tilt with respect to the light axis of the optical fiber.

With the above-mentioned arrangement, since the light axis of the transmitting light wave guide is designed so as to tilt with respect to the light axis of the optical fiber, it becomes possible to ensure the optical separation between the transmitting light wave guide and the received light wave guide more easily.

In the above-mentioned bidirectional communication apparatus, in the case when the light axis of the transmitting light wave guide is designed so as to tilt with respect to the light axis of the optical fiber, it is preferable to set the distance between the transmitting light wave guide and the optical fiber so that the central light axis of the transmitting light passes through the inside of the core on the end face of the optical fiber.

With the above-mentioned arrangement, the setting of the distance makes it possible to further ensure to couple the signal light from the transmitting light wave guide to the optical fiber, and consequently to make the transmission of signal light more stable.

In the above-mentioned bidirectional optical communication apparatus, it is preferable to design the end face of the optical fiber so as to have a conical shape.

With the above-mentioned arrangement, the end face of the optical fiber is designed so as to have a conical shape, it becomes possible to achieve the optical separation between the transmitting light wave guide and the received light wave guide by using simpler processes, and even if the optical fiber is rotated around the central axis thereof, the optical separation between the transmitting light wave guide and the received light wave guide can be maintained, thereby making it possible to simplify the fixing process of the optical fiber to the transmitting light wave guide and the received light wave guide.

Moreover, in the above-mentioned bidirectional optical communication apparatus, it is preferable to provide the optical fiber as a plastic optical fiber.

With the above-mentioned arrangement, when a plastic optical fiber is used as the optical fiber, it becomes possible to increase the core diameter of the optical fiber, and consequently to carry out the light-axis adjustment (positioning adjustment at the time of securing) between the optical fiber and the transmitting light wave guide as well as the received light wave guide more easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bidirectional optical communication device comprising:
   a light-emitting element for generating signal light in accordance with a data signal;
   a light-receiving element for receiving the signal light and for generating a data signal in accordance with the signal light;
   a transmitting light wave guide for projecting transmission light that is the signal light from the light-emitting element to an optical fiber outside;
   a received light wave guide for guiding received light that is signal light from the optical fiber outside; and
   positioning means for positioning the transmitting light wave guide, the received light wave guide and the optical fiber so as to optically connect with one another,
   wherein: the transmitting light wave guide and the received light wave guide are mutually separated optically from each other, the light axis of the transmission light is set so as to tilt with respect to the normal to the end face of the optical fiber by the positioning means, and a tilt angle of the light axis of the transmission light with respect to the normal to the end face of the optical fiber is greater than a divergent angle of the transmission light so as to avoid reflected light of the transmission light from the end face of the optical fiber from being made incident on the received light wave guide.

2. The bidirectional optical communication device as defined in claim 1, wherein a cross-sectional area in a direction orthogonal to the light axis of the received light wave guide is set to be greater than a cross-sectional area in a direction orthogonal to the light axis of the transmitting light wave guide.

3. The bidirectional optical communication device as defined in claim 1, wherein a center light axis of the transmitting light is preferably set so as to pass through the proximity of a core outer edge within a core on the end face of the optical fiber for transmitting signal light.

4. The bidirectional optical communication device as defined in claim 1, wherein a light-converging means for reducing diffusion of the received light from the transmitting light wave guide is installed.

5. The bidirectional optical communication device as defined in claim 4, wherein the light-converging means is designed as a lens made by shaping a light-releasing face for the transmitting light in the transmitting light wave guide into a curved face.

6. The bidirectional optical communication device as defined in claim 4, wherein the light-converging means is provided as a cylindrical lens which exhibits a light-converging function in a direction in which the transmitting light wave guide and the received light wave guide are aligned with each other.

7. The bidirectional optical communication device as defined in claim 4, wherein an angle, formed by the light axis of the transmitting light converged by the light-converging means and a normal to the face of an area to which the transmitting light is directed, is designed to be greater than an angular aperture of the converged transmitting light.

8. The bidirectional optical communication device as defined in claim 1, wherein each of core sections of the transmitting light wave guide and the received light wave guide is formed of a polymer material.

9. The bidirectional optical communication device as defined in claim 1, wherein an upper clad layer and a light-shielding layer, which prevent stray light from entering the light-receiving element, are formed on each of core sections of the transmitting light wave guide and the received light wave guide.

10. The bidirectional optical communication device as defined in claim 1, which is provided with a silicon substrate on which the light-receiving element is formed and the light-emitting element, the transmitting light wave guide and the received light wave guide are integrally assembled.

11. A bidirectional optical communication apparatus comprising:
   an optical fiber for transmitting signal light in a multi mode; and
   bidirectional optical communication devices that are respectively coupled to both of the end faces of the optical fiber, said bidirectional optical communication device being provided with a light-emitting element for generating signal light in accordance with a data signal, a light-receiving element for receiving the signal light and for generating a data signal in accordance with the signal light, a transmitting light wave guide for projecting transmission light that is the signal light from the light-emitting element to an optical fiber outside, and a received light wave guide for guiding received light that is signal light from the optical fiber outside,
   wherein: the transmitting light wave guide and the received light wave guide are mutually separated optically from each other, at an area on each end face to which the transmitting light connected to the optical fiber is projected, the light axis of the transmission light is set so as to tilt with respect to a normal to the end face of the optical fiber, and a tilt angle of the light axis of the transmission light with respect to the normal to the end face of -the optical fiber is set so as to avoid reflected light of the transmission light from the end face of the optical fiber from being made incident on the received light wave guide.

12. The bidirectional optical communication apparatus as defined in claim 11, wherein each of the end faces of the optical fiber is designed so as to intersect a hypothetical face that is orthogonal to the light axis of the optical fiber.

13. The bidirectional optical communication apparatus as defined in claim 11, wherein the light axis of the transmitting light wave guide is designed so as to tilt with respect to the light axis of the optical fiber.

14. The bidirectional optical communication apparatus as defined in claim 13, wherein the distance between the transmitting light wave guide and the optical fiber is set so that the central light axis of the transmitting light passes through the inside of the core on the end face of the optical fiber.

15. The bidirectional optical communication apparatus as defined in claim 11, wherein an end face of the optical fiber is designed to have a conical shape.

16. The bidirectional optical communication apparatus as defined in claim 11, wherein the optical fiber is provided as a plastic optical fiber.

17. The bidirectional optical communication apparatus as defined in claim 11, wherein said tilt angle is designed to be greater than a divergent angle of the transmission light.

18. The bidirectional optical communication apparatus as defined in claim 15, wherein a center axis of the conical end face is made coincident with the center axis of the optical fiber.

* * * * *

UNITED STATES PATENT AND TRADEMARK OFFICE
CERTIFICATE OF CORRECTION

PATENT NO.     : 6,501,876 B1
DATED          : December 31, 2002
INVENTOR(S)    : Okada et al.

It is certified that error appears in the above-identified patent and that said Letters Patent is hereby corrected as shown below:

<u>Title page,</u>
Item [56], FOREIGN PATENT DOCUMENTS, please change "10-2279283" to
-- 10-227928 --.

Signed and Sealed this

Ninth Day of September, 2003

JAMES E. ROGAN
*Director of the United States Patent and Trademark Office*